United States Patent
Bonnett et al.

(10) Patent No.: US 10,447,180 B2
(45) Date of Patent: Oct. 15, 2019

(54) CONTROL OF LARGE ELECTROMECHANICAL ACTUATORS

(71) Applicant: Hamilton Sundstrand Space Systems International, Inc., Windsor Locks, CT (US)

(72) Inventors: Scott C. Bonnett, Chicago, IL (US); Shawn Michael Nelson, Forreston, IL (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 48 days.

(21) Appl. No.: 14/993,152

(22) Filed: Jan. 12, 2016

(65) Prior Publication Data
US 2017/0201195 A1    Jul. 13, 2017

(51) Int. Cl.
*H02P 3/06* (2006.01)
*G05B 1/00* (2006.01)

(52) U.S. Cl.
CPC . *H02P 3/06* (2013.01); *G05B 1/00* (2013.01)

(58) Field of Classification Search
CPC .......................................................... H02P 3/02
USPC ....................................................... 318/452
See application file for complete search history.

(56) References Cited

U.S. PATENT DOCUMENTS

| | | | | |
|---|---|---|---|---|
| 3,798,427 A * | 3/1974 | Conners | ................ | G05B 19/416 318/371 |
| 4,755,070 A * | 7/1988 | Cerutti | ..................... | B41J 29/38 318/594 |
| 5,803,387 A * | 9/1998 | Mace | ..................... | G11B 27/13 242/333.6 |
| 6,029,098 A * | 2/2000 | Serizawa | ............. | G05B 19/416 408/3 |
| 6,640,791 B2 * | 11/2003 | Itoi | ..................... | F02D 41/0077 123/568.23 |
| 6,678,582 B2 * | 1/2004 | Waled | ..................... | B25J 9/161 318/568.11 |
| 6,785,745 B2 * | 8/2004 | Isshiki | ................... | G11B 19/04 710/15 |
| 7,382,570 B1 * | 6/2008 | Li | ........................ | G11B 5/5547 360/78.06 |

(Continued)

FOREIGN PATENT DOCUMENTS

KR    20160035464 A *  3/2016

*Primary Examiner* — Kawing Chan
(74) *Attorney, Agent, or Firm* — Cantor Colburn LLP

(57) ABSTRACT

A method of operating an electromechanical actuator (EMA) system includes determining a command time remaining for an actuator to attain a commanded position and determining a stop time required to stop movement of the actuator. The command time is compared to the stop time, and an electric motor driving the actuator is decelerated if the stop time is equal to or greater than the command time. An electromechanical actuator system includes an actuator and an electric motor operably connected to the actuator, the electric motor configured to drive movement of the actuator. A controller is operably connected to the electric motor to control operation of the actuator. The controller is configured to determine a command time remaining, determine a stop time, compare the command time to the stop time, and decelerate the electric motor if the stop time is equal to or greater than the command time.

13 Claims, 3 Drawing Sheets

(56) References Cited

U.S. PATENT DOCUMENTS

| | | |
|---|---|---|
| 7,549,407 B2 | 6/2009 | Krupadanam |
| 7,960,931 B2 | 6/2011 | Rodriquez et al. |
| 8,414,270 B2 | 4/2013 | Sha et al. |
| 8,653,780 B2 | 2/2014 | Cameron |
| 8,729,838 B2 | 5/2014 | Rozman et al. |
| 8,885,315 B2 | 11/2014 | Harke |
| 9,423,313 B2 * | 8/2016 | Douba .................. B30B 15/148 |
| 2001/0016165 A1 * | 8/2001 | Shimabukuro ........ B60K 6/365 |
| | | 417/2 |
| 2005/0274277 A1 * | 12/2005 | Alt ........................... B61B 1/00 |
| | | 104/88.01 |
| 2011/0211031 A1 * | 9/2011 | Satoh ..................... B65H 23/16 |
| | | 347/104 |
| 2013/0070013 A1 * | 3/2013 | Iesaki ...................... B41J 29/38 |
| | | 347/16 |
| 2015/0101337 A1 * | 4/2015 | Bond ........................ F02K 9/78 |
| | | 60/770 |
| 2016/0084200 A1 * | 3/2016 | Isaac ........................ F02K 9/84 |
| | | 60/232 |

* cited by examiner

CONTROL OF LARGE ELECTROMECHANICAL ACTUATORS

BACKGROUND

The subject matter disclosed herein relates electromechanical actuators. More specifically, the present disclosure relates to control of large, high power electromechanical actuators.

Electromechanical actuators are used in a wide array of applications, for example, movement of aircraft control surfaces and movement of rocket nozzles for space vehicles. Applications requiring high power electromechanical actuators are becoming more common, and are utilized to move and control large and/or heavy components. Such actuators utilize large, high power electrical motors to drive the electromechanical actuator. It is often desired to utilize pre-existing electrical motors for these applications, but such motors are often designed for constant speed applications, and are not optimal for use with electromechanical actuators due to the high inertia of the electrical motor. Electromechanical actuator applications require relatively high frequency response of the actuator position, which requires the motor to attain a speed and then reverse direction multiple times over a short time duration, for example, about one second.

Prior technology utilizes position feedback to control the position of the electromechanical actuator. Using standard feedback controls, high frequency motor speed reversals such as those required typically require much more current than either the motor was designed for or that is available from the power supply.

SUMMARY

In one embodiment, a method of operating an electromechanical actuator (EMA) system includes determining a command time remaining for an actuator to attain a commanded position and determining a stop time required to stop movement of the actuator. The command time is compared to the stop time, and an electric motor driving the actuator is decelerated if the stop time is equal to or greater than the command time.

Additionally or alternatively, in this or other embodiments determining the command time includes comparing the commanded position to a present actuator position.

Additionally or alternatively, in this or other embodiments the present actuator position is determined via one or more actuator position sensors disposed at the actuator.

Additionally or alternatively, in this or other embodiments the command time is calculated from a position difference between the commanded position and the present actuator position and from a present electric motor rotational speed.

Additionally or alternatively, in this or other embodiments a present electric motor rotational speed is utilized in determination of the stop time.

Additionally or alternatively, in this or other embodiments an available electrical current from the power source is utilized in determination of the stop time.

Additionally or alternatively, in this or other embodiments the available current together with a known inertia of the EMA are indicative of a maximum reverse torque or maximum deceleration that may be applied to the electric motor.

Additionally or alternatively, in this or other embodiments the stop time is calculated utilizing the maximum deceleration and a present motor rotational speed.

In another embodiment, an electromechanical actuator (EMA) system includes an actuator and an electric motor operably connected to the actuator, the electric motor configured to drive movement of the actuator. A power supply is operably connected to the electric motor to provide electrical power to the electric motor, and a controller is operably connected to the electric motor to control operation of the actuator. The controller is configured to determine a command time remaining for the actuator to attain a commanded position, determine a stop time required to stop movement of the actuator, compare the command time to the stop time, and decelerate the electric motor driving the actuator if the stop time is equal to or greater than the command time.

Additionally or alternatively, in this or other embodiments one or more shaft position sensors are located at the electric motor to determine a present electric motor rotational speed.

In yet another embodiment, a control system for an electromechanical actuator (EMA) includes one or more actuator position sensors located at an actuator to sense a present position of the actuator and one or more motor shaft position sensors located at an electric motor operably connected to the actuator. The one or more motor shaft position sensors are configured to allow the determination of present motor rotational speed of the electric motor. A controller is operably connected to the one or more actuator position sensors and the one or more motor shaft position sensors and is configured to compare the sensed present position to a commanded position to determine a position difference between the present position and the commanded position. The controller is further configured to determine a command time remaining for the actuator to attain a commanded position utilizing the position difference and the present motor rotational speed, determine a stop time required to stop movement of the actuator by calculating a maximum deceleration of the electric motor utilizing the present motor rotational speed, a known inertia of the electric motor and an available current to the electric motor, compare the command time to the stop time, and decelerate the electric motor if the stop time is equal to or greater than the command time.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
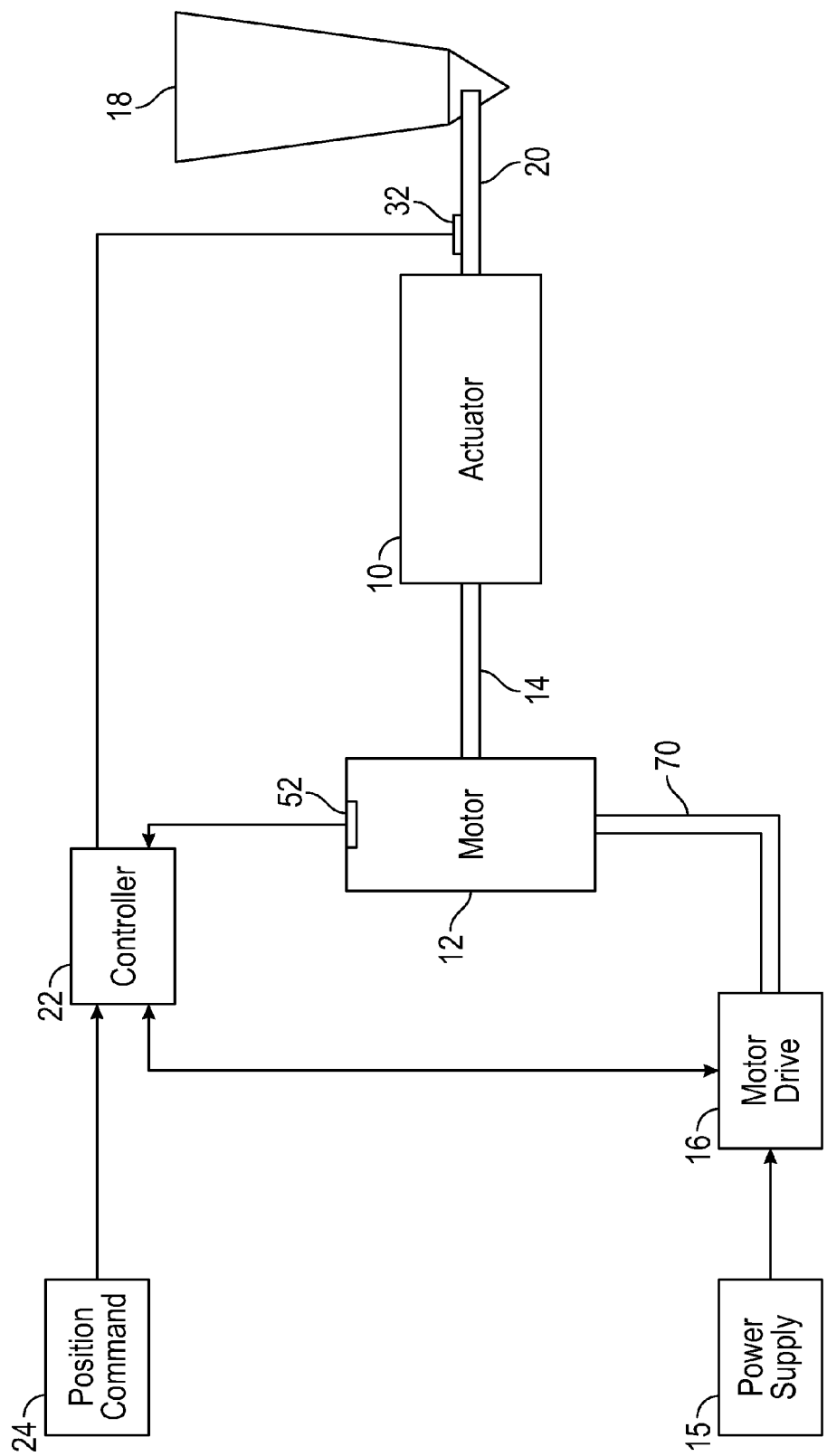
FIG. 1 is a schematic view of an embodiment of an electromechanical actuator and attendent control system arrangement.

Shown in FIG. 1 is an embodiment of an electromechanical actuator (EMA) and attendant control system arrangement. The arrangement includes an actuator 10 connected to, and driven by an electric motor 12. The actuator 10 may be a linear actuator, rotational actuator or the like. The connection may be through, for example, an first mechanical connection 14, which is an input shaft or other device. A motor drive 16 is operably connected to the electric motor 12 via electrical connection 70, to drive the electric motor 12. The motor drive 16 serves to gate electrical power from a power supply 15 based on signals received from a controller 22. The actuator 10 is connected to a controlled device 18 via a second mechanical connection (for example, a shaft) 20. The controlled device 18 is, for example, an aircraft control surface, a rocket nozzle, a large ship rudder, or large robotic components. The controller 22 is connected to the actuator 10 and the motor drive 16 to control actuator 10 position based on an input commanded position 24.

Figure 2:
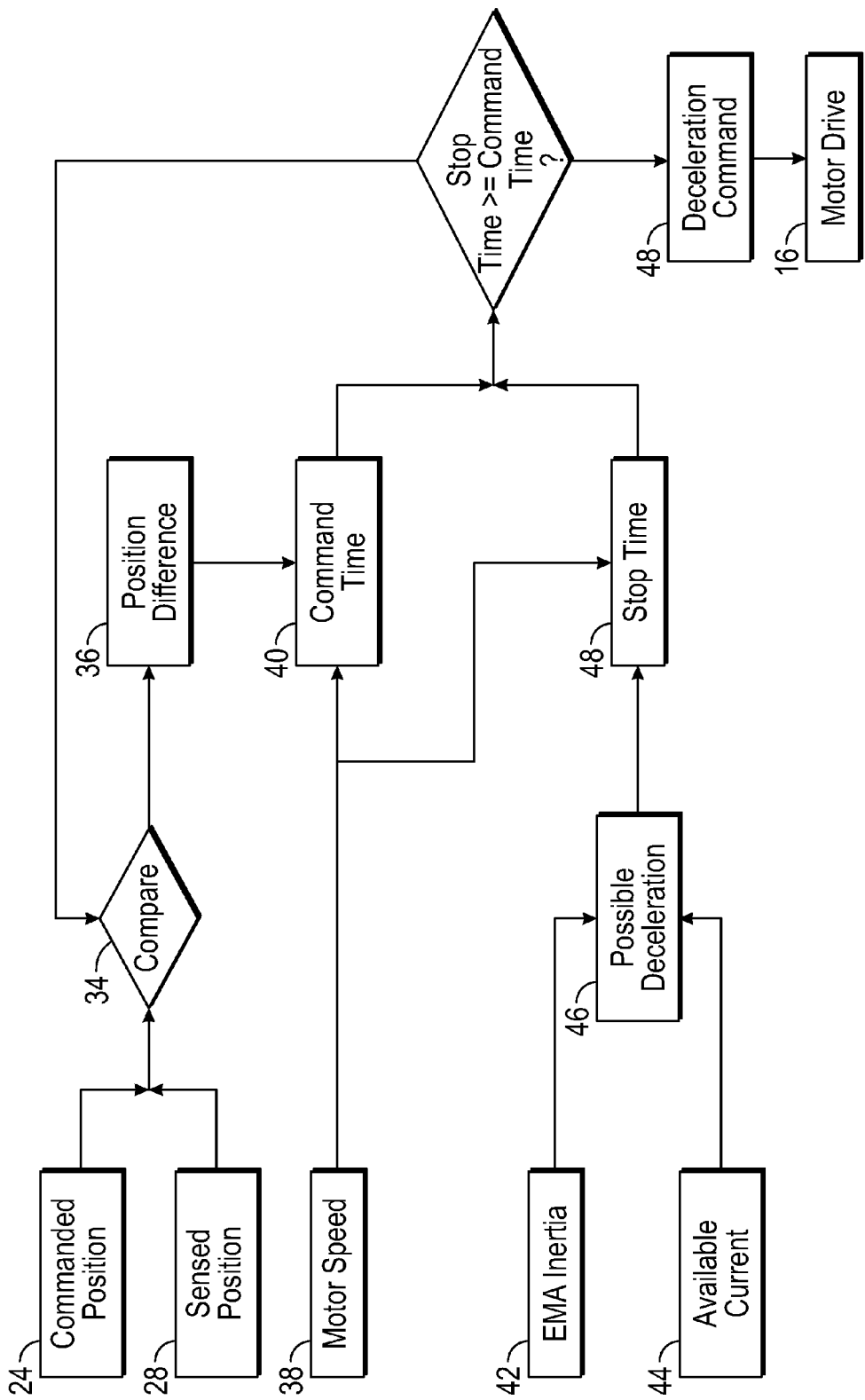
FIG. 2 is a schematic view of an embodiment of a control method for an embodiment of an electromechanical actuator.

Given the high inertia of a large electric motor 12, it is difficult to meet requirements quick response and quick reversal of the electric motor 12 to stop movement of the actuator 10 at the commanded position 24. Referring now to FIG. 2, a schematic illustration showing operation of the controller 22 is shown. The controller 22 addresses the issues with utilization of high-inertia electric motors 12 to drive large EMA's by introducing a feed forward control technique.

As shown in FIG. 2, the controller 22 receives the commanded position at block 24. The commanded position 24 is a selected actuator 10 position commanded by, for example, a flight control system a pilot, or through other forms of input. The commanded position 24 corresponds to a desired position of the controlled device 18 driven by the actuator 10. The controller 22 further receives a sensed position 28 of the actuator 10. The sensed position 28 is detected by, for example, an actuator position sensor 32 (see FIG. 1) at the actuator 10 and/or at the controlled device 18. The sensed position 28 is compared to the commanded position 24 at block 34 and a position difference 36 is calculated, indicative of how far the actuator 10 must be moved to attain the commanded position 24. The controller 22 further derives an electric motor rotational speed, referred to herein as motor speed 38 based on one or more motor shaft position sensors 52 (shown in FIG. 1) positioned at the electric motor 12. The motor speed 38 is indicative of a rate at which the actuator 10 is moving toward the commanded position 24. Given the motor speed 38 and the position difference 36, the controller 22 calculates a command time 40, or a time duration it will take for the actuator 10 to attain the commanded position 24 at the motor speed 38.

One limitation of traditional feedback control systems is that the motor is not commanded to reverse, and thus stop movement of the actuator until the actuator has attained, and subsequently exceeded, the commanded position. In high power EMA arrangements with high inertia electric motors, it takes greater time for the motor to successfully stop the movement of the actuator. To counteract this, controller 22 includes a feed forward provision in which the controller 22 predicts a time duration required for the motor 12 to stop movement of the actuator 10 at the command position 24. More specifically, the controller 22 utilizes a known EMA inertia 42 including the inertia of the electric motor 12, the controlled device 18, and the mechanical connections 14 & 20, in conjunction with an available current 44 from the power supply 15 to calculate a possible deceleration 46 of the electric motor 12. The available current 44 is indicative of a maximum reverse torque or deceleration that may be applied to the electric motor 12. The possible deceleration 46 is compared to the motor speed 38 to calculate a stop time 48, a duration of time for the electric motor 12 to decelerate to zero speed and thus for the actuator 10 to stop.

The stop time 48 is then compared to the command time 40. If the stop time 48 is less than the command time 40, the electric motor 12 continues to drive the actuator 10 toward the command position 10. One the other hand, if the stop time 48 is equal to or greater than the command time 40, the controller 22 issues a deceleration command 50 based on the available current 44 to the motor drive 16 to slow and stop the electric motor 12 and thus the actuator 10 at the command position 24. Issuing the deceleration command 50 prior to the actuator 10 reaching the command position 24 based on the predictive stop time 48 ensures that the electric motor 12 and the actuator 10 are fully decelerated to a stop at the command position 24, rather than beyond the command position 24, as would happen if a typical feedback control system was utilized.

The controller 22 and method disclosed herein ensures accurate positional control of the actuator 10 while enabling utilization of high inertia electric motors 12 to drive the EMA.

Figures 3A, 3B:
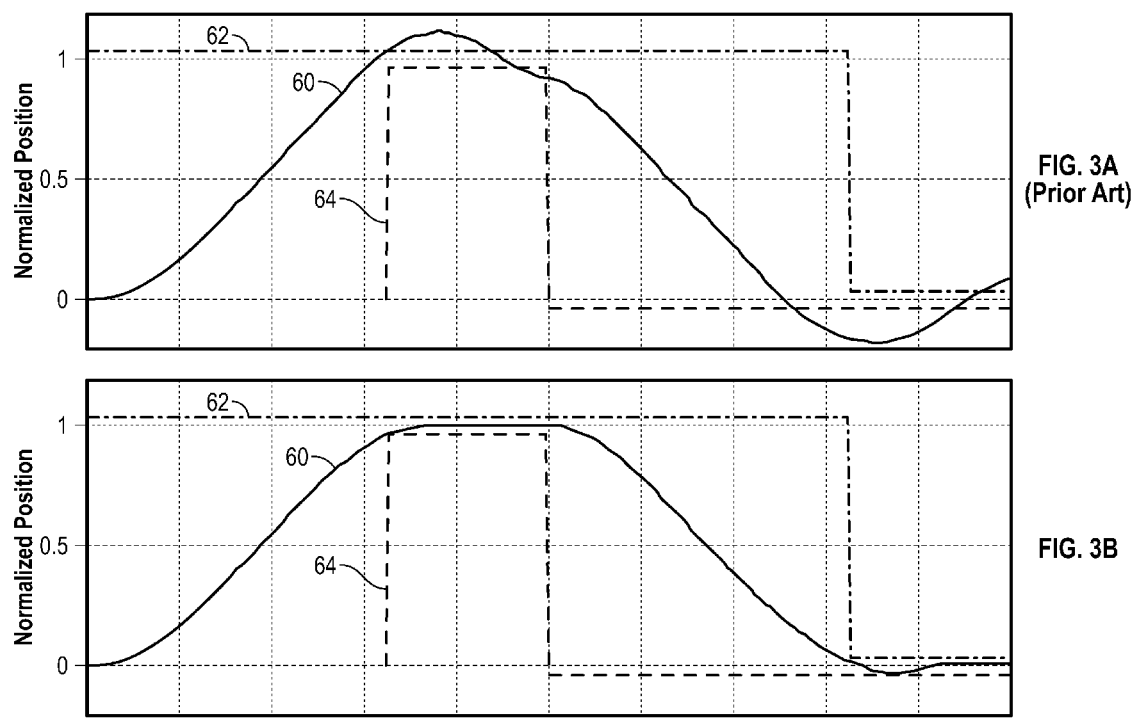
FIG. 3a illustrates operation of an electromechanical actuator utilizing a typical control system.
FIG. 3b illustrates operation of an electromechanical actuator utilizing an embodiment of the presently disclosed control system.

FIGS. 3a and 3b illustrate a difference in utilizing controller 22 versus prior control systems. In FIG. 3a, a graph of EMA position versus time is shown, for an EMA utilizing a traditional control system. The graph shows EMA position represented at 60, and upper and lower limits of EMA position, requirements for EMA position 60, shown at 62 and 64, respectively. FIG. 3b illustrates EMA position versus time utilizing controller 22. EMA position 60 is more consistently within the limits 62, 64, and illustrates a smoother operation of the EMA, compared to the operation illustrated in FIG. 3a.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of operating an electromechanical actuator (EMA) system, comprising:
   determining a command time remaining for an actuator to attain a commanded position;
   determining a stop time required to stop movement of the actuator;
   comparing the command time to the stop time; and
   decelerating an electric motor driving the actuator if the stop time is equal to or greater than the command time;
   wherein an available electrical current from the power source is utilized in determination of the stop time;
   wherein the available current together with a known inertia of the electric motor are indicative of a maximum reverse torque or maximum deceleration applicable to the electric motor; and
   wherein the actuator is operably connected to and configured to control a position of a rocket nozzle; and
   wherein the command time is calculated from a position difference between the commanded position and the present actuator position and from a present electric motor rotational speed.

2. The method of claim 1, wherein determining the command time includes comparing the commanded position to a present actuator position.

3. The method of claim 2, wherein the present actuator position is determined via one or more actuator position sensors disposed at the actuator.

4. The method of claim 1, wherein a present electric motor rotational speed is utilized in determination of the stop time.

5. The method of claim 1, wherein the stop time is calculated utilizing the maximum deceleration and a present motor rotational speed.

6. An electromechanical actuator (EMA) system, comprising:
   an actuator;
   an electric motor operably connected to the actuator, the electric motor configured to drive movement of the actuator;
   a power supply operably connected to the electric motor to provide electrical power to the electric motor; and
   a controller operably connected to the electric motor to control operation of the actuator, the controller configured to:
     determine a command time remaining for the actuator to attain a commanded position;
     determine a stop time required to stop movement of the actuator;
     compare the command time to the stop time; and
     decelerate the electric motor driving the actuator if the stop time is equal to or greater than the command time;
   wherein an available electrical current from the power source is utilized in determination of the stop time;
   wherein the available current together with a known inertia of the electric motor are indicative of a maximum reverse torque or maximum deceleration applicable to the electric motor;
   wherein the command time is calculated from a position difference between the commanded position and the present actuator position and from a present electric motor rotational speed; and
   a controlled device operably connected to the actuator to control position of the controlled device, the controlled device is a rocket nozzle.

7. The system of claim 6, wherein determining the command time includes comparing the commanded position to a present actuator position.

8. The system of claim 7, further comprising one or more actuator position sensors disposed at the actuator to determine the present actuator position.

9. The system of claim 7, further comprising one or more shaft position sensors disposed at the electric motor to determine a present electric motor rotational speed.

10. The system of claim 9, wherein the command time is calculated from a position difference between the commanded position and the present actuator position and from the present electric motor rotational speed.

11. The system of claim 7, wherein a present electric motor rotational speed is utilized in determination of the stop time.

12. The system of claim 6, wherein the stop time is calculated utilizing the maximum deceleration and a present motor rotational speed.

13. A control system for an electromechanical actuator (EMA), comprising:
   one or more actuator position sensors disposed at an actuator to sense a present position of the actuator;
   one or more motor shaft position sensors disposed at an electric motor operably connected to the actuator, the one or more motor shaft position sensors configured to allow the determination of present motor rotational speed of the electric motor; and
   a controller operably connected to the one or more actuator position sensors and the one or more motor shaft position sensors configured to:
     compare the sensed present position to a commanded position to determine a position difference between the present position and the commanded position;
     determine a command time remaining for the actuator to attain a commanded position utilizing the position difference and the present motor rotational speed;
     determine a stop time required to stop movement of the actuator by calculating a maximum deceleration of the electric motor utilizing the present motor rotational speed, a known inertia of the electric motor and an available current to the electric motor;
     compare the command time to the stop time; and
     decelerate the electric motor if the stop time is equal to or greater than the command time;
   wherein the control system is operably connected to and configured to control a position of a rocket nozzle.

* * * * *